Sept. 9, 1947. M. E. PUIM 2,427,301
BUCK RAKE LOADER ATTACHMENT FOR TRACTORS
Filed April 3, 1946 2 Sheets-Sheet 1
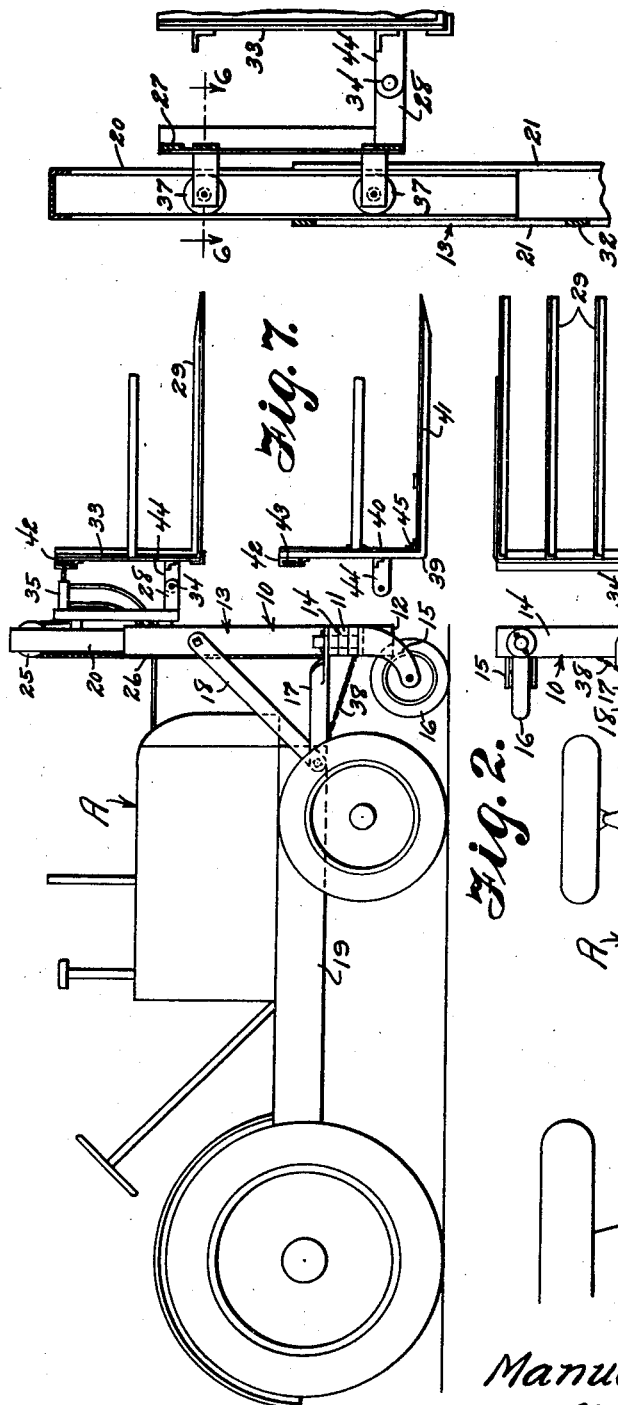
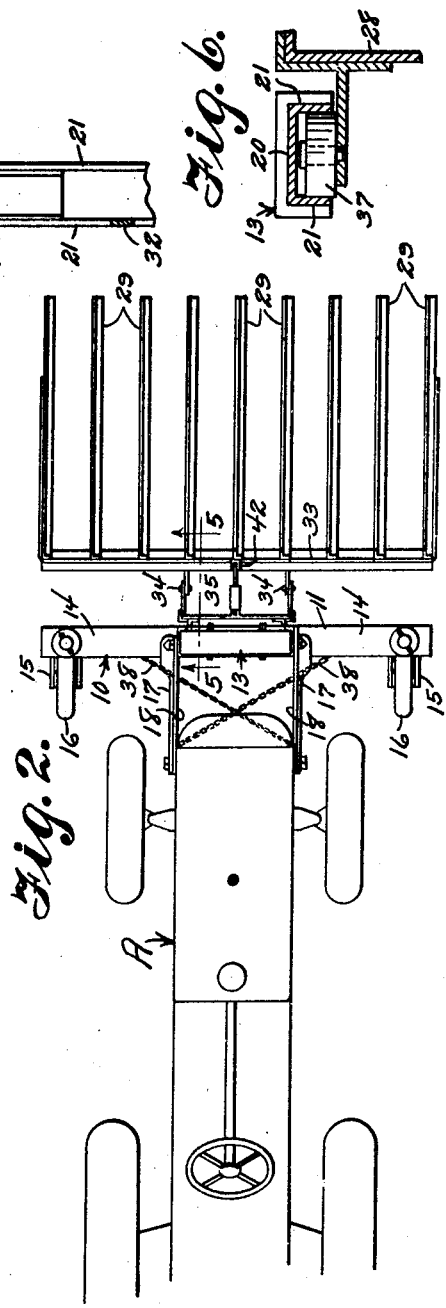
INVENTOR.
Manuel E. Puim
BY Victor J. Evans & Co.
ATTORNEYS

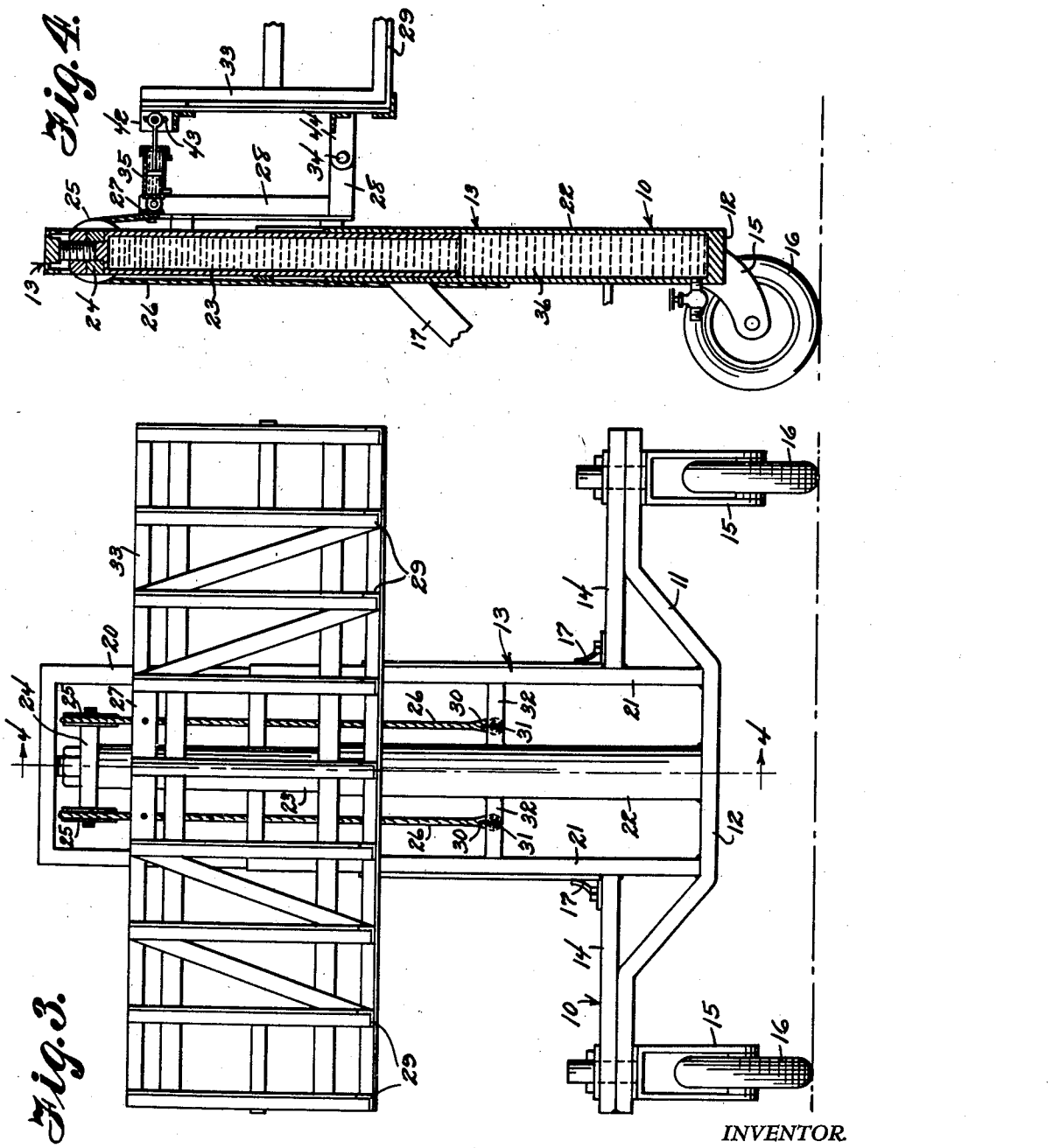

Patented Sept. 9, 1947

2,427,301

UNITED STATES PATENT OFFICE 2,427,301

BUCK RAKE LOADER ATTACHMENT FOR TRACTORS

Manuel E. Puim, Richmond, Calif.

Application April 3, 1946, Serial No. 659,240

1 Claim. (Cl. 214—113)

The invention relates to a hoisting apparatus, and more especially to a buck-rake loader attachment for motive trucks, particularly tractors.

The primary object of the invention is the provision of an attachment of this character, wherein a lift medium in this instance, a buck rake, can be automatically raised and lowered, as well as the discharging of its load, and the acquiring of such load, the attachment being adapted for association with a motor vehicle, particularly a tractor, which serves as the power unit therefor, and in the manner permitting the loading and unloading operations to be carried forth with ease and dispatch.

Another object of the invention is the provision of an attachment of this character, wherein the construction thereof is novel, and the arrangement of the parts thereof, unique, it being mobile and powered by the power unit, so that such attachment can travel from one point to another, and automatically function for the purposes intended thereof.

A further object of the invention is the provision of an attachment of this character, wherein its construction makes it adaptable for agricultural and industrial needs, and is usable with different types of power units, for the automatic operation of such attachment, the attachment being susceptible of one-man control, namely, the operator of the power unit, thus economical in the handling thereof.

A still further object of the invention is the provision of an attachment of this character, which is simple in construction, thoroughly reliable and efficient in operation, strong, durable, possessed of few parts, thus economical in repairs and replacement of parts, fluid controlled, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claim hereunto appended.

In the accompanying drawings:

Figure 1 is a side view of a tractor with the attachment constructed in accordance with the invention applied thereto.

Figure 2 is a top plan view thereof;

Figure 3 is a front view of the attachment;

Figure 4 is a sectional view taken on the line 4—4 of Figure 3 looking in the direction of the arrows;

Figure 5 is a sectional view taken on the line 5—5 of Figure 2 looking in the direction of the arrows;

Figure 6 is a detail sectional view taken on the line 6—6 of Figure 5 looking in the direction of the arrows and Figure 7 is a side view of a one piece buck lift tooth.

Similar reference characters indicate corresponding parts throughout the several views in the drawings.

Referring to the drawings in detail, A designates generally a tractor, which may be of any well known construction, and illustrates a type of power unit adaptable for association with the attachment constituting the present invention as will be hereinafter fully described.

The attachment constructed in accordance with the invention, comprises a vertically arranged frame structure, involving a lower wheeled carriage section 10, its cross truss beam 11 having an underslung intermediate portion 12 from which rises an open-frame tower 13, having lower lateral braces 14 superimposed on the outer ends of the beam 11 where they are joined in any suitable manner.

The outer ends of the truss beam 11 supports swivel caster wheel forks 15 having traction wheels 16 journalled therein for ground travel. The lateral braces 14 and the tower 13 have hitch connections 17 and 18, respectively to the fore part of the chassis frame 19 of the tractor, A, to be disposed vertically slightly in advance thereof for travel therewith when operating.

The tower 13 has a vertically shiftable upper section 20, which is selectively telescopically fitted therewith in any desirable manner to increase the elevation range of such tower or to reduce the height of the same, this section 20 being interfitted in the lower portion of the tower for trackage in the side vertical runs 21 of the latter, as best seen in Figure 5 of the drawings.

Rising vertical from the underslung portion 12 of the cross truss beam 11 at its center is a hydraulically operated lifting jack 22, its raising and lowering capping section 23 being fitted with a cross piece 24 which at the outer ends thereof has journaled thereon pulleys 25, over which are trained hoisting cables 26, having their upper ends secured to the upper portion of a rear or back runner 27 for a buck-rake head 28, provided with the usual gathering tines 29. The lower ends of the cables 26 are provided with terminal loops 30 detachably secured at 31 to cross struts 32 formed within the tower 13 at a low area thereof. The rake head 28 at its rear fencing 33 has lower hinge connection 34 with the runner 27, while connecting this fencing 33 with the upper portion of the runner is a fluid controlled tilting device 35, which functions to move the head to a forwardly inclined gathering position and also for discharging a load thereon, the former position being when the head is lowered, while the latter position is when the said head is elevated.

The fluid 36 for operating the jack 22 is supplied and exhausted to and from the same by a control system, not shown, and this is true with respect to the operation of the tilting device 35, and such system may be of any approved construction which is regulated through valves manually operated by the operator of the tractor A.

The runner 27 has roller fittings 37 with the tower 13, as best seen in Figure 5, as well as Figure 6 of the drawings.

When the jack is raised the head 28 is elevated for the hoisting of a load thereon, then when the jack is lowered the said head descends. The attachment is adaptable for gathering a load, such as large quantities of hay, elevating the load in a vertical plane bodily to a position where the same may be tilted to be conveniently dumped to a point of deposit from the rake head.

The attachment is driven by the tractor A to a point for service.

In addition to the hitch connections 17 and 18 there are stay chains 38 between the tractor and the attachment.

In Figure 7 there is shown one of the tines or buck lift teeth 29 and it will be noted that the tine is made of one piece of angle iron bent upwardly at 39 to form the vertical and horizontal portions 40 and 41. A bracket 42 secured at the upper end of the portion 40 has an elongated slot 43 for connection to the tilting device 35 and the bracket 44 adjacent the bend 39 for pivoted connection at 34 to the runner 27, and the side fencing bar 45 is a combination of the fencing 33. This provides a reliable durable construction which is further strengthened by the cross iron braces 45 secured at the inner side of the bend 39 and to the portion 41 of the tine 29. It is believed that the operation of the device will be apparent to those skilled in the art and it is to be understood that changes in the details of construction, arrangement and combination of parts may be resorted to without departing from the spirit of the invention and the scope of the appended claim.

What is claimed is:

An attachment of the kind described, comprising a wheeled carriage having swiveled traction wheel, a tower rising from the carriage, a hydraulically operated lifting jack supported within the tower, a runner vertically movable on the tower, a tilting buck-rake head carried by the runner, said buck-rake head having a plurality of one piece buck-lift teeth having a horizontal portion and a vertical portion and strengthening cross members secured to said vertical and horizontal portions at the meeting point thereof and to said horizontal portion intermediate the meeting point and its end, a fluid operated tilting device connecting the head with the runner, means for hitching the carriage with a power unit, and an extensible upper section to the tower.

MANUEL E. PUIM.

REFERENCES CITED

The following references are of record in the file of this patent:

UNITED STATES PATENTS

| Number | Name | Date |
| --- | --- | --- |
| 1,533,894 | Peterson | Apr. 14, 1925 |
| 1,875,103 | Mosel | Aug. 30, 1932 |
| 2,200,898 | Rouse | May 14, 1940 |
| 2,320,601 | Howell | June 1, 1943 |
| 2,341,945 | Rabon | Feb. 15, 1944 |
| 2,413,097 | Barker | Dec. 24, 1946 |